(12) United States Patent
Chen et al.

(10) Patent No.: US 11,466,845 B2
(45) Date of Patent: Oct. 11, 2022

(54) LUMINATING MODULE

(71) Applicant: XIAMEN LEEDARSON LIGHTING CO., LTD, Fujian (CN)

(72) Inventors: Jian Chen, Fujian (CN); Qiqiang Lin, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/133,598

(22) Filed: Dec. 23, 2020

(65) Prior Publication Data

US 2021/0348749 A1 Nov. 11, 2021

(30) Foreign Application Priority Data

May 7, 2020 (CN) .......................... 202020731370.3

(51) Int. Cl.
| | |
|---|---|
| *F21V 23/04* | (2006.01) |
| *F21V 23/00* | (2015.01) |
| *F21V 29/70* | (2015.01) |
| *H05B 45/345* | (2020.01) |
| *H05B 45/37* | (2020.01) |
| *H05B 45/54* | (2020.01) |
| *H05B 47/19* | (2020.01) |
| *H02M 7/06* | (2006.01) |
| *F21V 29/89* | (2015.01) |

(52) U.S. Cl.
CPC ........ *F21V 23/0435* (2013.01); *F21V 23/005* (2013.01); *F21V 29/70* (2015.01); *F21V 29/89* (2015.01); *H05B 45/345* (2020.01); *H05B 45/37* (2020.01); *H05B 45/54* (2020.01); *H05B 47/19* (2020.01); *H02M 7/06* (2013.01)

(58) Field of Classification Search
None
See application file for complete search history.

(56) References Cited

U.S. PATENT DOCUMENTS

| | | | |
|---|---|---|---|
| 8,013,545 B2 * | 9/2011 | Jonsson | F21V 23/04 |
| | | | 315/318 |
| 2018/0202640 A1 * | 7/2018 | He | H01Q 1/44 |
| 2020/0096187 A1 * | 3/2020 | Ter Weeme | F21V 23/004 |

* cited by examiner

*Primary Examiner* — Anh Q Tran
(74) *Attorney, Agent, or Firm* — Chun-Ming Shih; Lanway IPR Services

(57) ABSTRACT

A luminating module includes a base, a radio frequency antenna and a luminance module. The base includes a circuit layer, an isolation layer, and a heat-dissipating layer. And the isolation layer is disposed between the circuit layer and the heat-dissipating layer. The radio frequency antenna is disposed at the circuit layer. Also, the radio frequency antenna receives a radio analog control signal. The radio frequency module is disposed at the circuit layer. In addition, the radio frequency module transforms the radio analog control signal into a digital control signal. The luminance module is integrated on the base and electrically coupled to the circuit layer. Besides, the luminance module illuminates based on the digital control signal. Specifically, the base, the radio frequency antenna, the radio frequency module and the luminance module integrate with each other via the circuit layer.

16 Claims, 8 Drawing Sheets

LUMINATING MODULE

FIELD

The present invention relates to a luminating module, and more particularly, to a luminating module of integrating multiple components for stabilizing radio frequency capabilities.

BACKGROUND

A conventional intelligent light bulb has mutual-independently disposed components, such as an aluminum base, a driving power source, and a radio frequency module. Specifically, the radio frequency module is required to be installed on a driving circuit board. And the radio frequency module's antenna penetrates exposed to the aluminum base, or the aluminum base may significantly obstruct the antenna from receiving required radio signals.

However, during the conventional intelligent light bulb's fabrication, the antenna may not have enough proximity to the base because of installation errors. Therefore, the conventional light bulb's radio frequency function is severely sabotaged in some directions. On top of that, the conventional light bulb is likely to acquire an unstable radio frequency function and a less qualified yield.

SUMMARY

The present disclosure aims at disclosing a luminating module that includes a base, a radio frequency antenna and a luminance module. The base includes a circuit layer, an isolation layer, and a heat-dissipating layer. And the isolation layer is disposed between the circuit layer and the heat-dissipating layer. The radio frequency antenna is disposed at the circuit layer. Also, the radio frequency antenna receives a radio analog control signal. The radio frequency module is disposed at the circuit layer. In addition, the radio frequency module transforms the radio analog control signal into a digital control signal. The luminance module is integrated on the base and electrically coupled to the circuit layer. Besides, the luminance module illuminates based on the digital control signal. Specifically, the base, the radio frequency antenna, the radio frequency module and the luminance module integrate with each other via the circuit layer.

In one example, the base includes an aluminum material.

In one example, the heat-dissipating layer includes a metal heat-dissipating region and an isolative heat-dissipating region.

In one example, the luminating module also includes a luminance adjusting circuit that is disposed at the circuit layer and electrically coupled to the luminance module and the radio frequency module. Also, the luminance adjusting circuit adjusts the luminance module's luminance using the digital control signal.

In one example, the luminating module also includes a driving circuit that is disposed at the circuit layer and electrically coupled to the radio frequency module, the luminance adjusting circuit and the luminance module. Additionally, the driving circuit powers up the radio frequency module, the luminance adjusting circuit and the luminance module using an external power source.

In one example, the driving circuit transforms the external power source from an alternative current (AC) type to a direct current (DC) type.

In one example, the driving circuit includes a rectifying bridge, an inductor and a capacitor. The rectifying bridge has a first input terminal electrically coupled to a line wire of the external power source. Besides, the rectifying bridge has a second input terminal electrically coupled to a naught wire of the external power source. The inductor has a first terminal electrically coupled to an output terminal of the rectifying bridge. Moreover, the inductor has a second terminal electrically coupled to the luminance adjusting circuit and the radio frequency module. The capacitor has a first terminal electrically coupled to a second terminal of the inductor. And the capacitor has a second terminal electrically coupled to a ground terminal of the rectifying bridge and to ground.

In one example, the driving circuit includes a voltage-sensitive resistor that has a first terminal electrically coupled to the first input terminal of the rectifying bridge. Also, the voltage-sensitive resistor has a second terminal electrically coupled to the second input terminal of the rectifying bridge.

In one example, the driving circuit includes a fuse that has a first terminal electrically coupled to the line wire of the external power source. And the fuse has a second terminal electrically coupled to the first input terminal of the rectifying bridge.

In one example, the rectifying bridge includes a first diode, a second diode, a third diode and a fourth diode. The first diode has a positive terminal electrically coupled to the ground terminal of the rectifying bridge. And the first diode has a negative terminal electrically coupled to the first input terminal of the rectifying bridge. The second diode has a positive terminal electrically coupled to the positive terminal of the first diode. Moreover, the second diode has a negative terminal electrically coupled to the second input terminal of the rectifying bridge. The third diode has a positive terminal electrically coupled to the negative terminal of the first diode. Besides, the third diode has a negative terminal electrically coupled to the output terminal of the rectifying bridge. The fourth diode has a positive terminal electrically coupled to the negative terminal of the second diode.

Additionally, the fourth diode has a negative terminal electrically coupled to the negative terminal of the third diode.

In one example, the driving circuit, the radio frequency module, and the radio frequency antenna are integrated on the base.

In one example, the driving circuit, the radio frequency module, and the radio frequency antenna are mutually-independently disposed on the base.

In one example, the luminance adjusting circuit includes a luminance adjusting chip that has a signal input terminal electrically coupled to the radio frequency module for receiving the digital control signal. Besides, the luminance adjusting chip has an output terminal electrically coupled to the luminance module. Specifically, the luminance adjusting chip generates a constant current based on the digital control signal and to drive the luminance module using the constant current.

In one example, the luminance adjusting module includes a first resistor, a second resistor, a third resistor, a second capacitor, a third capacitor, a fourth resistor and a fifth resistor. The first resistor has a first terminal electrically coupled to a voltage input terminal for receiving a rectified voltage and electrically coupled to a voltage input terminal of the luminance adjusting chip. And the first resistor has a second terminal electrically coupled to a simulation terminal of the luminance adjusting chip. The second resistor has a first terminal electrically coupled to the second terminal of the first resistor. The third resistor has a first terminal electrically coupled to a second terminal of the second resistor. Besides, the third resistor has a second terminal electrically coupled to the signal input terminal of the luminance adjusting chip. The second capacitor is electrically coupled to the second resistor in parallel. The third capacitor is electrically coupled to the third resistor in parallel. The fourth resistor has a first terminal electrically coupled to a current sampling terminal of the luminance adjusting chip. Also, the fourth resistor has a second terminal electrically coupled to a ground terminal of the luminance adjusting chip. The fifth resistor is electrically coupled to the fourth resistor in parallel.

In one example, the radio frequency module includes a radio frequency power supply chip and a radio frequency transformation chip. The radio frequency power supply chip has a voltage input terminal electrically coupled to the external power source. The radio frequency transformation chip has a voltage input terminal electrically coupled to an output terminal of the radio frequency power supply chip for receiving power. In addition, the radio frequency transformation chip has a PWM output terminal for outputting the digital control signal. Besides, the radio frequency transformation chip has a signal input terminal electrically coupled to the radio frequency antenna for receiving the radio analog control signal. The radio frequency transformation chip transforms the radio analog control signal into the digital control signal.

In one example, the radio frequency module also includes a fifth capacitor, a fifth diode, a sixth resistor, a second inductor, a fourth capacitor, a sixth diode and a seventh resistor. The fifth capacitor has a first terminal electrically coupled to the output terminal of the radio frequency power supply chip. Besides, the fifth capacitor has a second terminal electrically coupled to a ground terminal of the radio frequency power supply chip. The fifth diode has a negative terminal electrically coupled to the second terminal of the fifth capacitor. Additionally, the fifth diode has a positive terminal electrically coupled to ground. The sixth resistor has a first terminal electrically coupled to a current sampling terminal of the radio frequency power supply chip. And the sixth resistor has a second terminal electrically coupled to the second terminal of the fifth capacitor. The second inductor has a first terminal electrically coupled to the second terminal of the fifth capacitor. The fourth capacitor has a first terminal electrically coupled to a second terminal of the second inductor. Moreover, the fourth capacitor has a second terminal electrically coupled to the positive terminal of the fifth diode. The sixth diode has a negative terminal electrically coupled to the first terminal of the fifth capacitor. Besides, the sixth diode has a positive terminal electrically coupled to the first terminal of the fourth capacitor. The seventh resistor is electrically coupled to the fourth capacitor in parallel.

In one example, the luminating module also includes a driving circuit that is disposed at the circuit layer and electrically coupled to the radio frequency module and the luminance module. In addition, the driving circuit powers up the radio frequency module and the luminance module using an external power source.

In one example, the driving circuit transforms the external power source from an AC type to a DC type.

In one example, the radio frequency antenna is F-formed.

In one example, the radio frequency antenna has a thickness of substantially between 0.6 millimeter (mm) and 1 mm.

In one example, the radio frequency antenna has a resonant length of substantially 17 mm.

In one example, the radio frequency antenna has a height of substantially 5 mm. In one example, the radio frequency antenna's feed point is distanced from a ground point on the luminating module of substantially 5 mm.

In one example, the radio frequency antenna is reversed-F-formed.

In one example, the radio frequency antenna operates under substantially a frequency band of 2.4 GHz ISM centered at 2.45 GHz.

DETAILED DESCRIPTION

As mentioned above, the present disclosure discloses a luminating module that aims at stabilizing the radio frequency functions for illuminating components, such as an intelligent light bulb. Specifically, the disclosed luminating module integrates certain critical components for aiding the stabilization of radio frequency functions.

Figure 1:
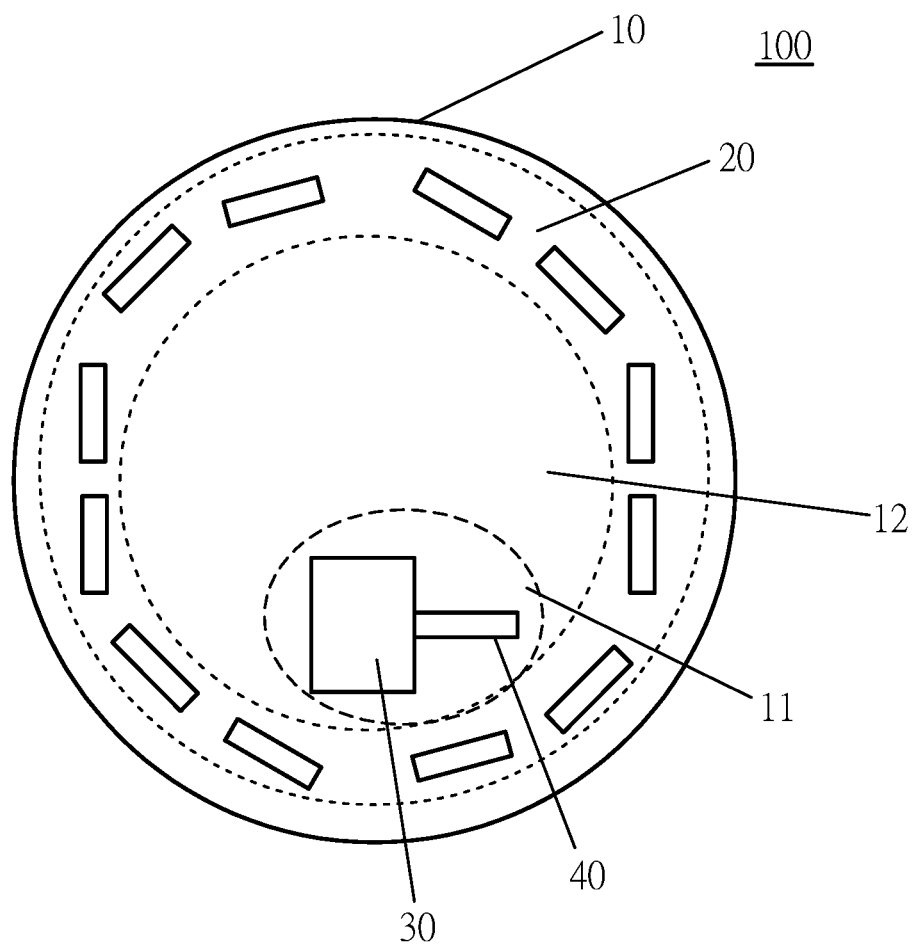
FIG. 1 illustrates a luminating module according to one example of the present disclosure.

FIG. 1 illustrates a luminating module 100 according to one example of the present disclosure. The luminating module 100 includes a base 10, a radio frequency antenna 40, a radio frequency module 30 and a luminance module 20.

The base 10 includes a circuit layer, an isolation layer, and a heat-dissipating layer. And the isolation layer is disposed between the circuit layer and the heat-dissipating layer. In some examples, the base 10 is substantially made of aluminum. In some examples, the heat-dissipating layer includes a metal heat-dissipating region 12 and an isolative heat-dissipating region 11. Also, the isolative heat-dissipating region 11 covers both the radio frequency module 30 and the radio frequency antenna 40.

The radio frequency antenna 40 is disposed at the circuit layer. Also, the radio frequency antenna 40 receives a radio analog control signal, for example, for controlling the luminance module 20's luminance.

The radio frequency module 30 is disposed at the circuit layer. In addition, the radio frequency module 30 transforms the radio analog control signal into a digital control signal, for example, via pulse-width modulation (PWM).

The luminance module 20 is integrated on the base 10 and electrically coupled to the circuit layer. Besides, the luminance module 20 illuminates based on the digital control signal.

Specifically, the base 10, the radio frequency antenna 40, the radio frequency module 30 and the luminance module 20 integrate with each other via the circuit layer. With the aid of such integration, the radio frequency antenna 40 substantially shares same frequency features with the base 10, the luminance module 20 and the radio frequency module 30. Such that all the other integrated components will not interfere with the radio frequency antenna 40's operations. On top of that, the luminating module 100's entire radio frequency function can be significantly stabilized.

Figure 2:
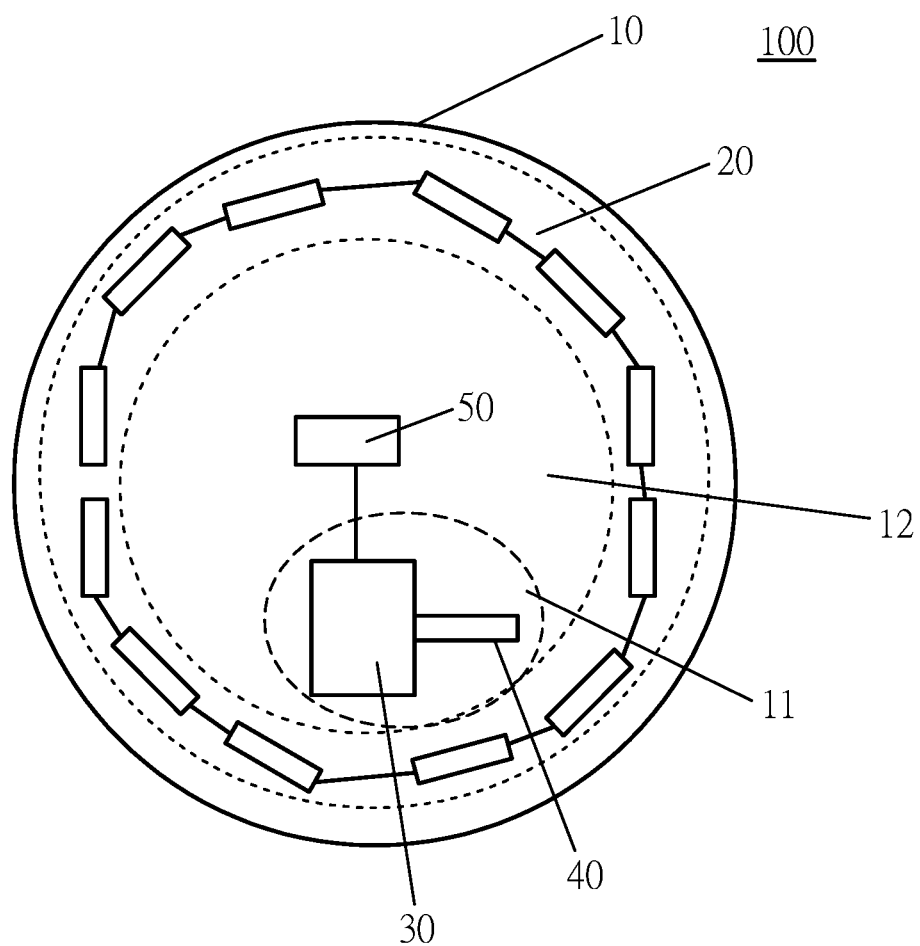
FIG. 2 illustrates the luminating module shown in FIG. 1 that additionally includes a luminance adjusting circuit according to one example.

In some examples, the luminating module 100 also includes a luminance adjusting circuit 50. FIG. 2 illustrates the luminating module 100 shown in FIG. 1 that additionally includes the luminance adjusting circuit 50 according to one example. Specifically, the luminance adjusting circuit 50 is disposed at the circuit layer and electrically coupled to the luminance module 20 and the radio frequency module 30. Also, the luminance adjusting circuit 50 adjusts the luminance module 20's luminance using the digital control signal.

Figure 3:
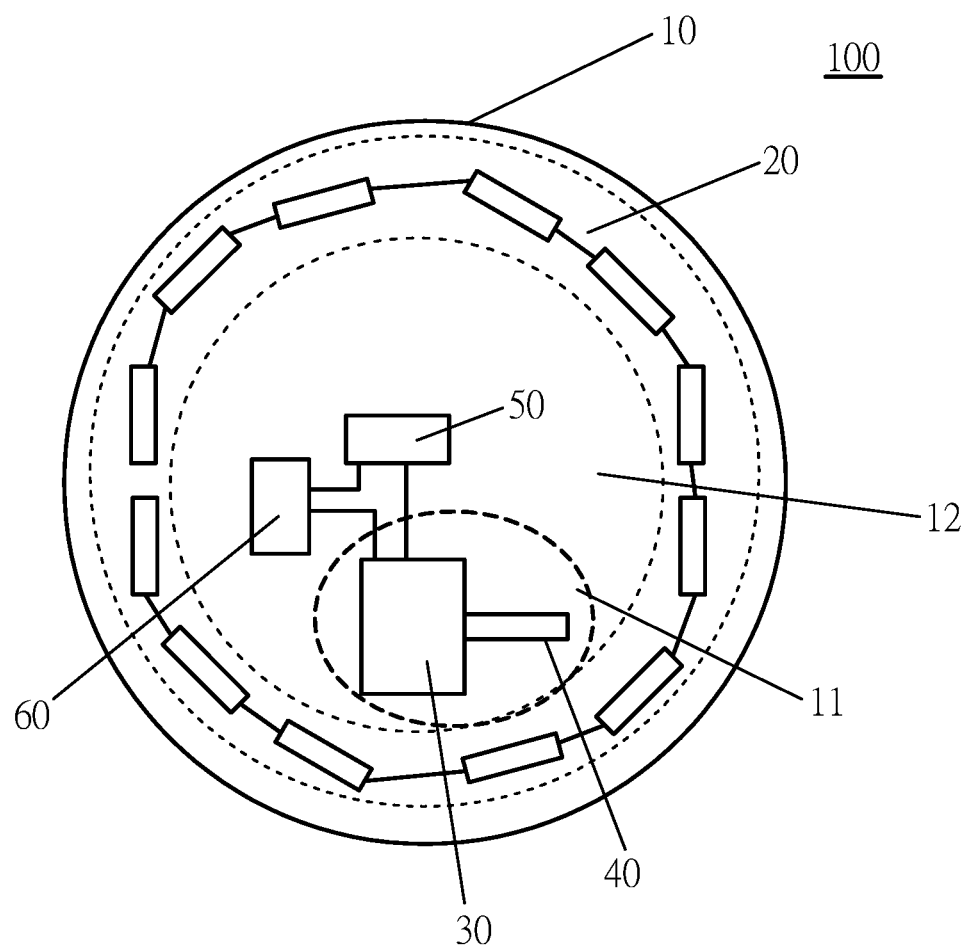
FIG. 3 illustrates the luminating module shown in FIG. 1 that additionally includes a driving circuit according to one example.

In some examples, the luminating module 100 also includes a driving circuit 60. FIG. 3 illustrates the luminating module 100 shown in FIG. 1 that additionally includes the driving circuit 60 according to one example. The driving circuit 60 is disposed at the circuit layer and electrically coupled to the radio frequency module 30, the luminance adjusting circuit 50 and the luminance module 20. Additionally, the driving circuit 60 powers up the radio frequency module 30, the luminance adjusting circuit 50 and the luminance module 20 using an external power source. In some examples, the driving circuit 60 is disposed within the circuit layer of the base 10. Moreover, in one example, the driving circuit 60 transforms the external power source from an alternative current (AC) type to a direct current (DC) type.

In some examples, the driving circuit 60 acts as a switch and be integrated with the radio frequency module 30 and the radio frequency antenna 40 on the base 10. In some other examples, the driving circuit 60 is independent from the base 10. For example, when the luminating module 100 requires high power, the driving circuit 60 correspondingly requires a transformer, more components and a larger volume, such that the driving circuit 60 may act as a power board that is made of FR-4 epoxy laminate material. As such, the radio frequency module 30 and the luminance module 20 are integrated on the base 10, and the power board (i.e., the driving circuit) is electrically connected to the base via at least one socket for powering up the base 10.

Figure 4:
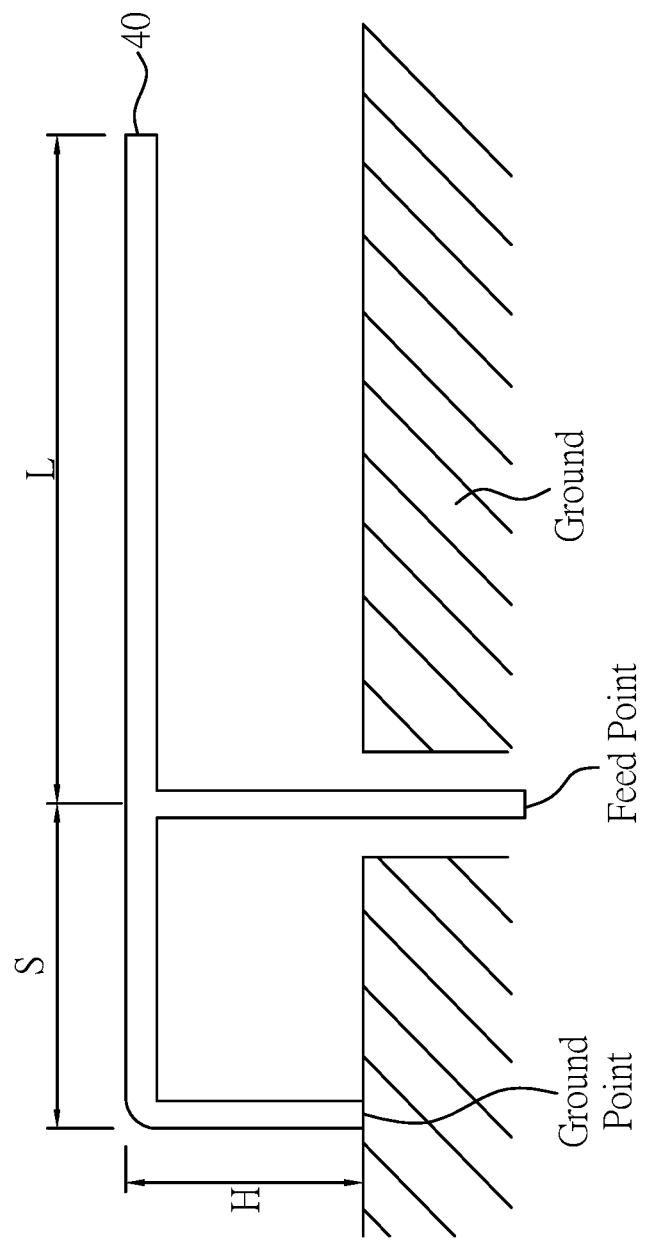
FIG. 4 illustrates a radio frequency antenna shown in FIG. 1 in detail according to one example.

FIG. 4 illustrates the radio frequency antenna 40 shown in FIG. 1 in detail according to one example. In a first example, the radio frequency antenna 40 is F-formed. In a second example, the radio frequency antenna 40 has a thickness of substantially between 0.6 millimeter (mm) and 1 mm. In a third example, the radio frequency antenna 40 has a resonant length of substantially 17 mm, a height of substantially 5 mm, and/or a feed point that is distanced from a ground point on the luminating module 100 of substantially 5 mm.

In one example, the radio frequency antenna 40 is reverse-F-formed. As such, the radio frequency antenna 40 can operate under substantially a frequency band of 2.4 GHz Industrial Scientific Medical (ISM) band centered at 2.45 GHz. Additionally, the radio frequency antenna 40 is designed to have a 10 db bandwidth that is larger than 100 MHz and to have a vacuum wavelength of 122 mm. Exemplarily, the radio frequency antenna 40 is made of FR-4 epoxy laminate material that has a dielectric coefficient of 4.4, a loss tangent of approximately 0.02, a dielectric thickness of 0.8 mm. Specifically, the radio frequency antenna 40 may have a vacuum quarter wavelength of 30 nm and a medium quarter wavelength of 15 nm. Assume that the radio frequency antenna 40 is half disposed in air and half disposed within the medium. Therefore, an average wavelength of the vacuum quarter wavelength and the medium quarter wavelength is approximately 22 nm. In addition, assume that the radio frequency antenna 40's microstrip length is 1 mm. Therefore, approximately, the radio frequency antenna 40 may have a total length (L+H) of 22 nm with a resonant length L being 17 mm and a height H being 5 nm. Specifically, the radio frequency antenna 40's operating frequency can be adjusted by adjusting the resonant length L, and the radio frequency antenna 40's bandwidth can be adjusted by adjusting the height H. Besides, the radio frequency antenna 40 has a distance S between its feed point and its ground point for adjusting the radio frequency antenna 40's voltage standing wave radio (VSWR). Exemplarily, the distance S is approximately 5 nm.

Figure 5:
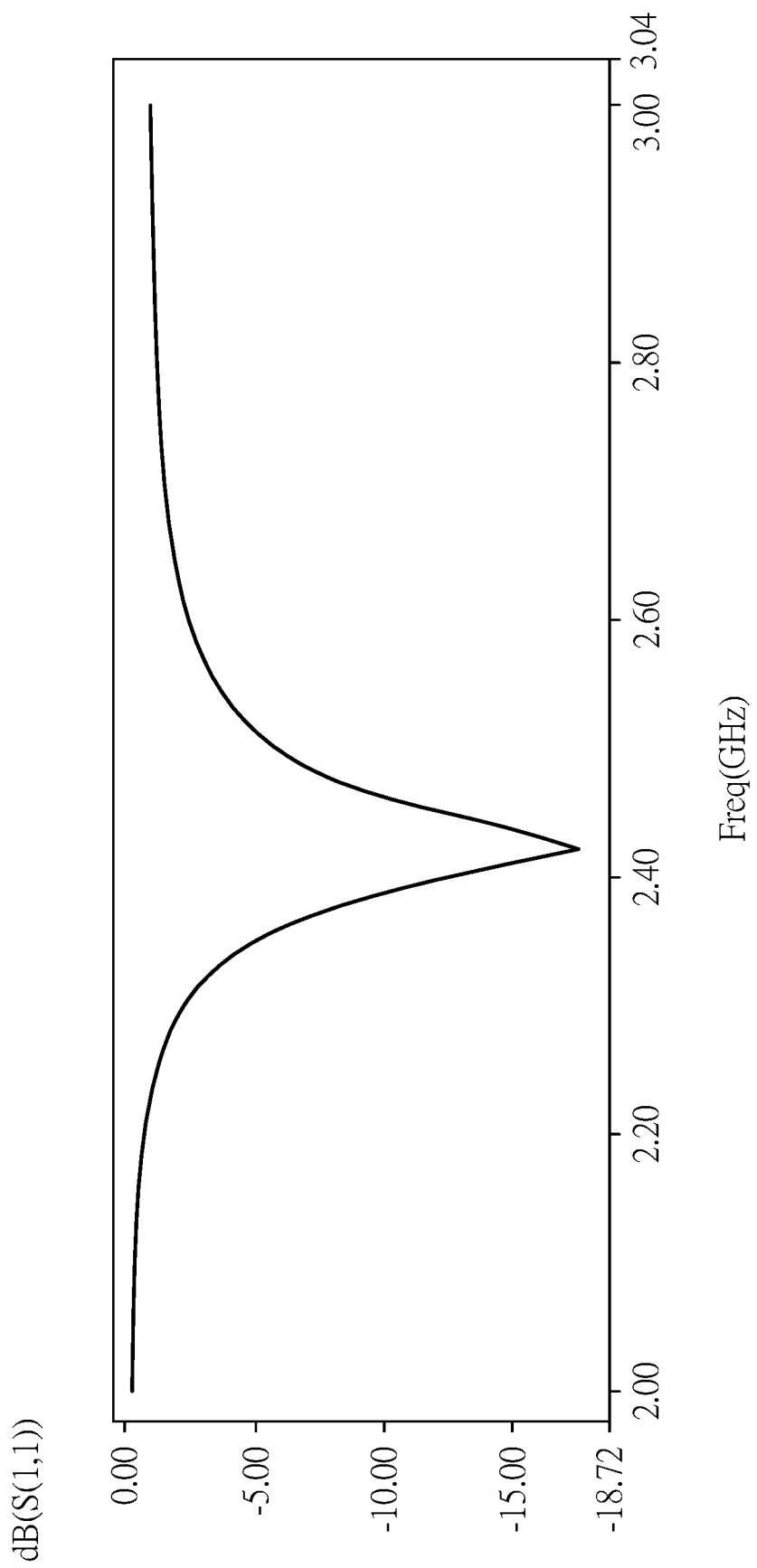
FIG. 5 illustrates a simulation of the radio frequency antenna's return loss in one example.
Figure 6:
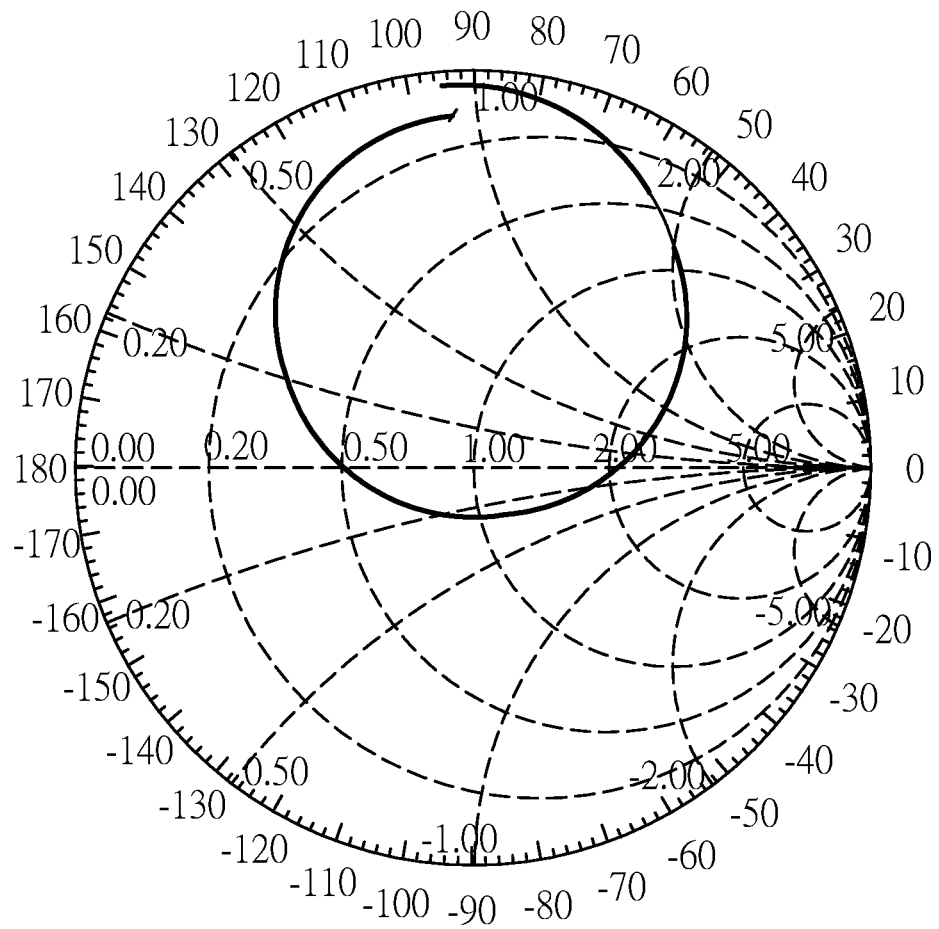
FIG. 6 illustrates a simulation of the radio frequency antenna's Smith Chart according to one example.

FIG. 5 illustrates a simulation of the radio frequency antenna 40's return loss in one example. Also, FIG. 6 illustrates a simulation of the radio frequency antenna 40's Smith Chart according to one example. Specifically, by referencing to the radio frequency antenna 40's return loss in FIG. 5, the radio frequency antenna 40's resonant frequency can be determined by referencing to the Smith Chart shown in FIG. 6. For example, in combination of FIG. 5 and FIG. 6, it can be observed that the radio frequency antenna 40's return loss between 2.0 GHz and 3.0 GHz has a resonant frequency of approximately 2.42 GHz, a 10 db-bandwidth of approximately 80 MHz, and a return loss for the resonant frequency of approximately −18 dB.

In one example, the luminance module 20 and the radio frequency module 30 are integrated. Consequently, installation errors and high costs are substantially discarded in fabricating the luminating module 100, such that the luminating module 100's radio frequency function can be perfectly performed without being significantly interfered.

Figure 7:
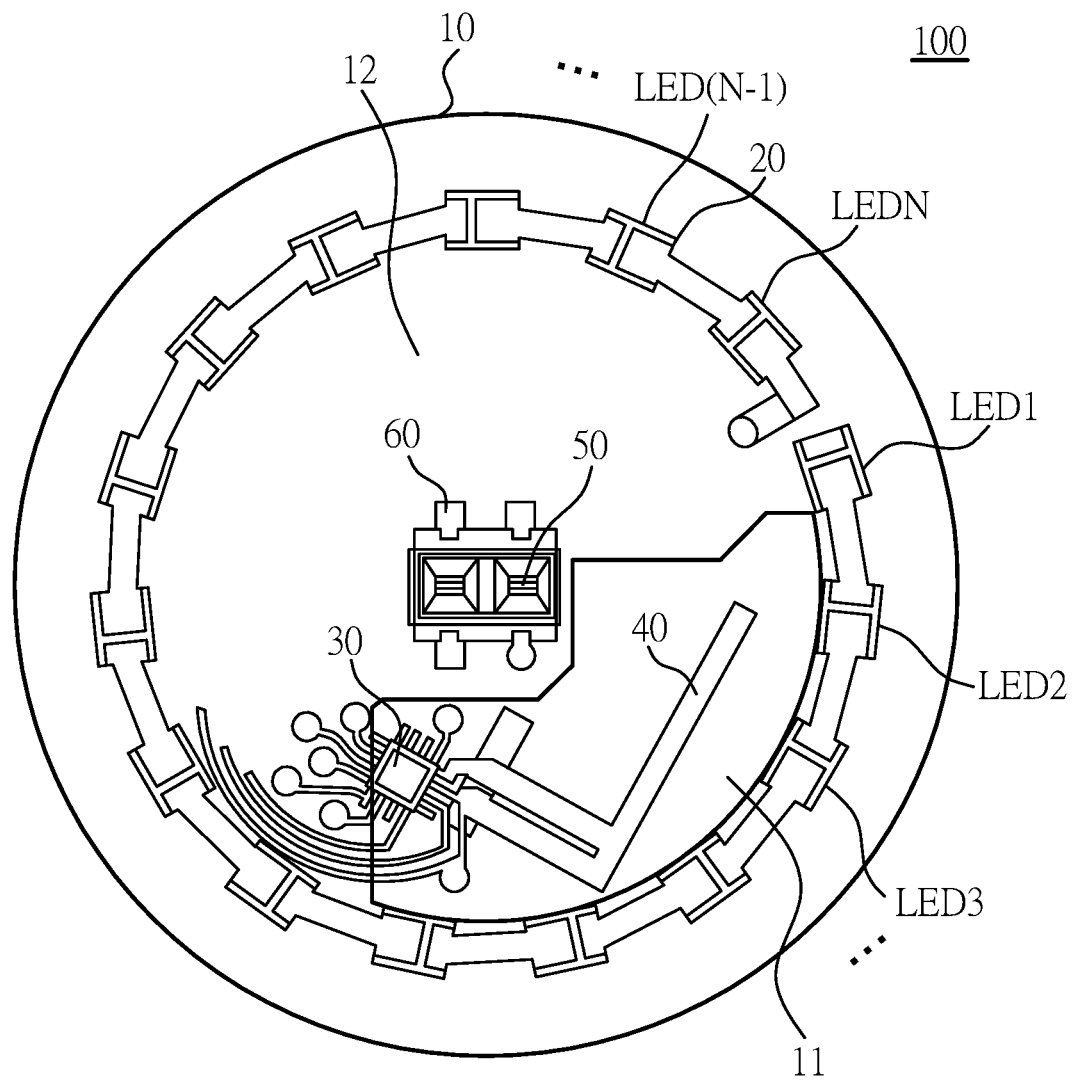
FIG. 7 illustrates a schematic diagram of the luminating module shown in FIG. 1 that includes multiple light emitting diodes according to one example.
Figure 8:
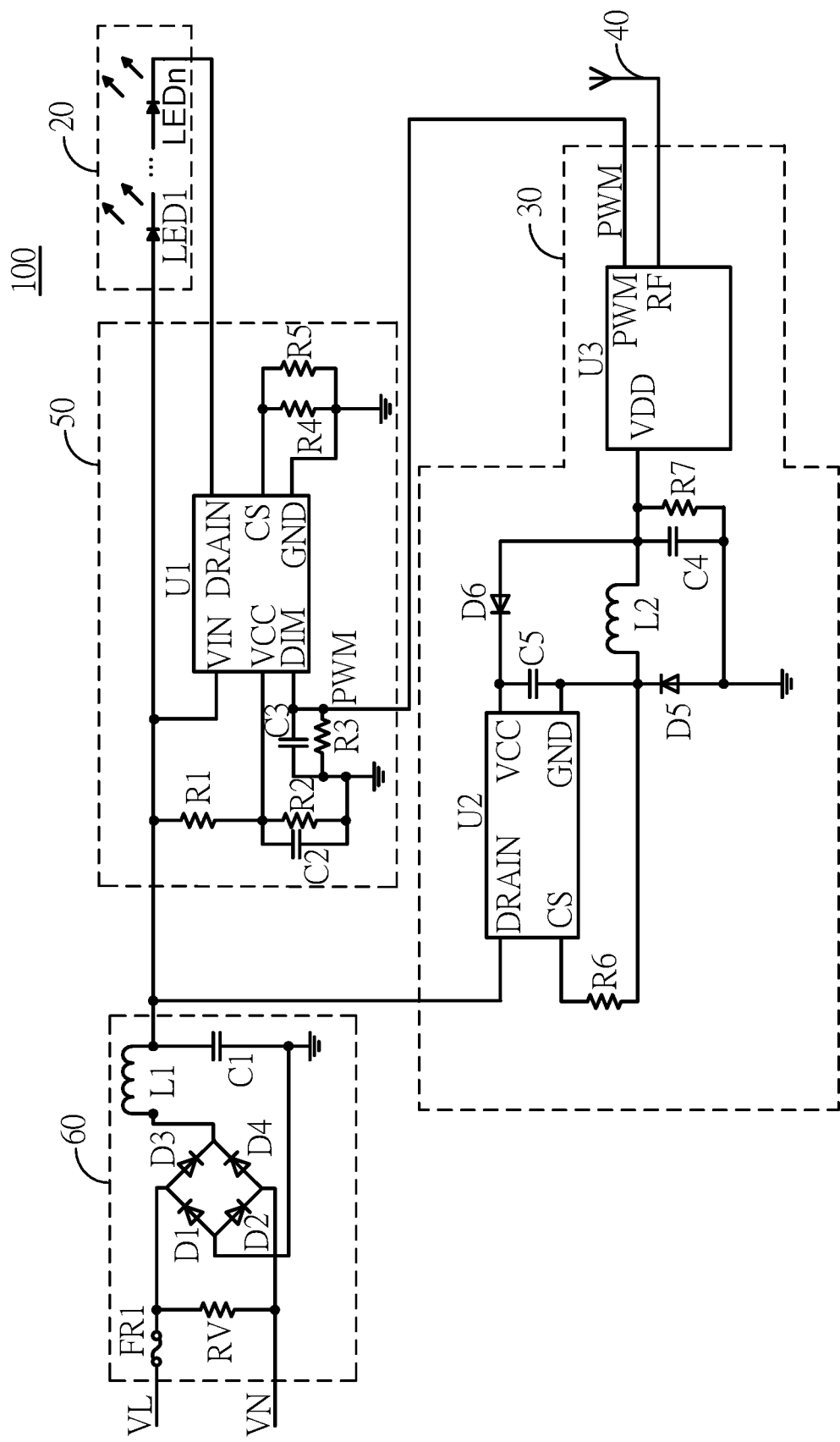
FIG. 8 illustrates a schematic circuit diagram of the luminating module shown in FIG. 1 according to one example.

FIG. 7 illustrates a schematic diagram of the luminating module 100 shown in FIG. 1 that includes multiple light emitting diodes LED1, LED2, LED3, . . . , LED(N−1), and LEDN, where N is a positive integer. FIG. 8 illustrates a schematic circuit diagram of the luminating module 100 shown in FIG. 1.

In one example, the light emitting diodes LED1, LED2, LED3, . . . , LED(N−1), and LEDN are arranged circumferentially and electrically connected in series at the base 10's perimeter.

In one example, the radio frequency module 30 supports protocols of at least Zigbee, Bluetooth, Wi-Fi, Z-WAVE and/or infrared remote control.

As shown in FIG. 8, the driving circuit 60 includes a rectifying bridge, an inductor L1 and a capacitor C1. The rectifying bridge has a first input terminal electrically coupled to a line wire VL of the external power source. Besides, the rectifying bridge has a second input terminal electrically coupled to a naught wire VN of the external power source. Exemplarily, the rectifying bridge include four diodes D1, D2, D3 and D4.

The inductor L1 has a first terminal electrically coupled to an output terminal of the rectifying bridge. Moreover, the inductor L1 has a second terminal electrically coupled to the luminance adjusting circuit 50 and the radio frequency module 30. The capacitor C1 has a first terminal electrically coupled to a second terminal of the inductor L1. And the capacitor C1 has a second terminal electrically coupled to a ground terminal of the rectifying bridge and to ground. The capacitor C1 and the inductor L1 form an electromagnetic interference filter for filtering a rectified voltage from the rectifying bridge.

In one example, the driving circuit includes a voltage-sensitive resistor RV that has a first terminal electrically coupled to the first input terminal of the rectifying bridge. Also, the voltage-sensitive resistor RV has a second terminal electrically coupled to the second input terminal of the rectifying bridge.

In one example, the driving circuit 60 includes a fuse FR1 that has a first terminal electrically coupled to the line wire VL of the external power source. And the fuse FR1 has a second terminal electrically coupled to the first input terminal of the rectifying bridge.

In one example, the first diode D1 has a positive terminal electrically coupled to the ground terminal of the rectifying bridge. And the first diode D1 has a negative terminal electrically coupled to the first input terminal of the rectifying bridge. The second diode D2 has a positive terminal electrically coupled to the positive terminal of the first diode D1. Moreover, the second diode D2 has a negative terminal electrically coupled to the second input terminal of the rectifying bridge. The third diode D3 has a positive terminal electrically coupled to the negative terminal of the first diode D1. Besides, the third diode D3 has a negative terminal electrically coupled to the output terminal of the rectifying bridge. The fourth diode D4 has a positive terminal electrically coupled to the negative terminal of the second diode D2. Additionally, the fourth diode D4 has a negative terminal electrically coupled to the negative terminal of the third diode D3.

In one example, the luminance adjusting circuit 50 includes a luminance adjusting chip U1 that has a signal input terminal DIM electrically coupled to the radio frequency module 30 for receiving the digital control signal PWM. Besides, the luminance adjusting chip U1 has an output terminal DRAIN electrically coupled to the luminance module 20. Specifically, the luminance adjusting chip U1 generates a constant current based on the digital control signal and drives the luminance module 20 using the constant current. In one example, the luminance adjusting chip U1 is implemented using a chip having a serial number BP5711EJ.

In one example, the luminance adjusting circuit 50 includes a first resistor R1, a second resistor R2, a third resistor R3, a second capacitor C2, a third capacitor C3, a fourth resistor R4 and a fifth resistor R5. The first resistor R1 has a first terminal electrically coupled to a voltage input terminal for receiving a rectified voltage from the driving circuit 60 and electrically coupled to a voltage input terminal VIN of the luminance adjusting chip U1. And the first resistor R1 has a second terminal electrically coupled to a simulation terminal VCC of the luminance adjusting chip U1. The second resistor R2 has a first terminal electrically coupled to the second terminal of the first resistor R1. The third resistor R3 has a first terminal electrically coupled to a second terminal of the second resistor R2. Besides, the third resistor R3 has a second terminal electrically coupled to the signal input terminal DIM of the luminance adjusting chip. The second capacitor C2 is electrically coupled to the second resistor R2 in parallel. The third capacitor C3 is electrically coupled to the third resistor R3 in parallel. The fourth resistor R4 has a first terminal electrically coupled to a current sampling terminal CS of the luminance adjusting chip U1. Also, the fourth resistor R4 has a second terminal electrically coupled to a ground terminal GND of the luminance adjusting chip U1. The fifth resistor R5 is electrically coupled to the fourth resistor R4 in parallel.

In one example, the radio frequency module 30 includes a radio frequency power supply chip U2 and a radio frequency transformation chip U3. Specifically, the radio frequency power supply chip U2 forms a buck circuit with its surrounding circuitry. Therefore, the radio frequency power supply chip U2 bucks a direct current from the driving circuit 60 for powering up the radio frequency transformation chip U3.

The radio frequency power supply chip U2 has a voltage input terminal DRAIN electrically coupled to the external power source via the driving circuit 60. The radio frequency transformation chip U3 has a voltage input terminal VDD electrically coupled to an output terminal of the radio frequency power supply chip VCC for receiving power. In addition, the radio frequency transformation chip U3 has a PWM output terminal for outputting the digital control signal PWM. Besides, the radio frequency transformation chip U3 has a signal input terminal RF electrically coupled to the radio frequency antenna 40 for receiving the radio analog control signal. The radio frequency transformation chip U3 transforms the radio analog control signal into the digital control signal PWM. In some examples, the radio frequency power supply chip U2 is made using a chip having a serial number BP2525B, and the radio frequency transformation chip U3 is made using a chip having a serial number GL6207L.

In one example, the radio frequency module 30 also includes a fifth capacitor C5, a fifth diode D5, a sixth resistor R6, a second inductor L2, a fourth capacitor C4, a sixth diode D6 and a seventh resistor R7. The fifth capacitor C5 has a first terminal electrically coupled to the output terminal VCC of the radio frequency power supply chip U2. Besides, the fifth capacitor C5 has a second terminal electrically coupled to a ground terminal GND of the radio frequency power supply chip U2. The fifth diode D5 has a negative terminal electrically coupled to the second terminal of the fifth capacitor C5. Additionally, the fifth diode D5 has a positive terminal electrically coupled to ground. The sixth resistor R6 has a first terminal electrically coupled to a current sampling terminal CS of the radio frequency power supply chip U2. And the sixth resistor R6 has a second terminal electrically coupled to the second terminal of the fifth capacitor C5. The second inductor L2 has a first terminal electrically coupled to the second terminal of the fifth capacitor C5. The fourth capacitor C4 has a first terminal electrically coupled to a second terminal of the second inductor L2. Moreover, the fourth capacitor C4 has a second terminal electrically coupled to the positive terminal of the fifth diode D5. The sixth diode D6 has a negative terminal electrically coupled to the first terminal of the fifth capacitor C5. Besides, the sixth diode D6 has a positive terminal electrically coupled to the first terminal of the fourth capacitor C4. The seventh resistor R7 is electrically coupled to the fourth capacitor C4 in parallel.

In one example, the driving circuit 60 transforms the external power source from an AC type to a DC type.

In some examples, the disclosed luminating module 100 is installed as a light bulb or a lamp.

By integrating multiple critical component, the disclosed luminating module 100 is substantially immune from radio frequency disturbances, such that its radio frequency functions can be well-performed in comparison to the conventional light bulb.

The invention claimed is:

1. A luminating module, comprising:
a base, comprising a circuit layer, an isolation layer, and a heat-dissipating layer, wherein the isolation layer is disposed between the circuit layer and the heat-dissipating layer;
a radio frequency antenna, disposed at the circuit layer, and configured to receive a radio analog control signal;
a radio frequency module, disposed at the circuit layer, and configured to transform the radio analog control signal into a digital control signal;
a luminance module, integrated on the base, electrically coupled to the circuit layer, and configured to illuminate based on the digital control signal;
a luminance adjusting circuit, disposed at the circuit layer, electrically coupled to the luminance module and the radio frequency module, and configured to adjust the luminance module's luminance using the digital control signal; and
a driving circuit, disposed at the circuit layer, and electrically coupled to the radio frequency module, the luminance adjusting circuit and the luminance module, and configured to power up the radio frequency module, the luminance adjusting circuit and the luminance module using an external power source;
wherein the base, the radio frequency antenna, the radio frequency module and the luminance module are further configured to integrate with each other via the circuit layer, wherein the driving circuit comprises:
a rectifying bridge, having a first input terminal electrically coupled to a line wire of the external power source, and having a second input terminal electrically coupled to a naught wire of the external power source;
an inductor, having a first terminal electrically coupled to an output terminal of the rectifying bridge, and having a second terminal electrically coupled to the luminance adjusting circuit and the radio frequency module; and
a capacitor, having a first terminal electrically coupled to a second terminal of the inductor, and having a second terminal electrically coupled to a ground terminal of the rectifying bridge and to ground, wherein the driving circuit further comprises:
a voltage-sensitive resistor, having a first terminal electrically coupled to the first input terminal of the rectifying bridge, and having a second terminal electrically coupled to the second input terminal of the rectifying bridge.

2. The luminating module of claim 1, wherein the base comprises an aluminum material.

3. The luminating module of claim 1, wherein the heat-dissipating layer comprises a metal heat-dissipating region and an isolative heat-dissipating region.

4. The luminating module of claim 1, wherein the driving circuit is further configured to transform the external power source from an alternative current (AC) type to a direct current (DC) type.

5. The luminating module of claim 1, wherein the driving circuit further comprises:
a fuse, having a first terminal electrically coupled to the line wire of the external power source, and having a second terminal electrically coupled to the first input terminal of the rectifying bridge.

6. The luminating module of claim 1, wherein the rectifying bridge comprises:
a first diode, having a positive terminal electrically coupled to the ground terminal of the rectifying bridge, and having a negative terminal electrically coupled to the first input terminal of the rectifying bridge;
a second diode, having a positive terminal electrically coupled to the positive terminal of the first diode, and having a negative terminal electrically coupled to the second input terminal of the rectifying bridge;
a third diode, having a positive terminal electrically coupled to the negative terminal of the first diode, and having a negative terminal electrically coupled to the output terminal of the rectifying bridge; and
a fourth diode, having a positive terminal electrically coupled to the negative terminal of the second diode, and having a negative terminal electrically coupled to the negative terminal of the third diode.

7. The luminating module of claim 1, wherein the driving circuit, the radio frequency module, and the radio frequency antenna are integrated on the base.

8. The luminating module of claim 1, wherein the driving circuit, the radio frequency module, and the radio frequency antenna are mutually-independently disposed on the base.

9. The luminating module of claim 1, wherein the luminance adjusting circuit comprises:
a luminance adjusting chip, having a signal input terminal electrically coupled to the radio frequency module for receiving the digital control signal, and having an output terminal electrically coupled to the luminance module, wherein the luminance adjusting chip is configured to generate a constant current based on the digital control signal and to drive the luminance module using the constant current.

10. The luminating module of claim 9, wherein the luminance adjusting circuit further comprises:
a first resistor, having a first terminal electrically coupled to a voltage input terminal for receiving a rectified voltage and electrically coupled to a voltage input terminal of the luminance adjusting chip, and having a second terminal electrically coupled to a simulation terminal of the luminance adjusting chip;
a second resistor, having a first terminal electrically coupled to the second terminal of the first resistor;
a third resistor, having a first terminal electrically coupled to a second terminal of the second resistor, and having a second terminal electrically coupled to the signal input terminal of the luminance adjusting chip;
a second capacitor, electrically coupled to the second resistor in parallel;
a third capacitor, electrically coupled to the third resistor in parallel;
a fourth resistor, having a first terminal electrically coupled to a current sampling terminal of the luminance adjusting chip, and having a second terminal electrically coupled to a ground terminal of the luminance adjusting chip; and
a fifth resistor, electrically coupled to the fourth resistor in parallel.

11. The luminating module of claim 1, wherein the radio frequency module comprises:
a radio frequency power supply chip, having a voltage input terminal electrically coupled to an external power source; and
a radio frequency transformation chip, having a voltage input terminal electrically coupled to an output terminal of the radio frequency power supply chip for receiving power, having a PWM output terminal for outputting the digital control signal, and having a signal input terminal electrically coupled to the radio frequency antenna for receiving the radio analog control signal, wherein the radio frequency transformation chip is configured to transform the radio analog control signal into the digital control signal.

12. The luminating module of claim 11, wherein the radio frequency module further comprises:
   a fifth capacitor, having a first terminal electrically coupled to the output terminal of the radio frequency power supply chip, and having a second terminal electrically coupled to a ground terminal of the radio frequency power supply chip;
   a fifth diode, having a negative terminal electrically coupled to the second terminal of the fifth capacitor, and having a positive terminal electrically coupled to ground;
   a sixth resistor, having a first terminal electrically coupled to a current sampling terminal of the radio frequency power supply chip, and having a second terminal electrically coupled to the second terminal of the fifth capacitor;
   a second inductor, having a first terminal electrically coupled to the second terminal of the fifth capacitor;
   a fourth capacitor, having a first terminal electrically coupled to a second terminal of the second inductor, and having a second terminal electrically coupled to the positive terminal of the fifth diode;
   a sixth diode, having a negative terminal electrically coupled to the first terminal of the fifth capacitor, and having a positive terminal electrically coupled to the first terminal of the fourth capacitor; and
   a seventh resistor, electrically coupled to the fourth capacitor in parallel.

13. The luminating module of claim 1, further comprising:
   a driving circuit, disposed at the circuit layer, and electrically coupled to the radio frequency module and the luminance module, and configured to power up the radio frequency module and the luminance module using an external power source.

14. The luminating module of claim 13, wherein the driving circuit is further configured to transform the external power source from an AC type to a DC type.

15. The luminating module of claim 1, wherein the radio frequency antenna is F-formed.

16. The luminating module of claim 1, wherein the radio frequency antenna has a thickness of substantially between 0.6 millimeter (mm) and 1 mm.

* * * * *